F. H. JONES.
CLUTCH.
APPLICATION FILED FEB. 10, 1910.

1,017,762.

Patented Feb. 20, 1912.

3 SHEETS—SHEET 1.

Witnesses
Frank A. Fahle
Thomas W. McMeans

Inventor
Frank H. Jones,
By Bradford & Hood
Attorneys

F. H. JONES.
CLUTCH.
APPLICATION FILED FEB. 10, 1910.

1,017,762.

Patented Feb. 20, 1912.

3 SHEETS—SHEET 2.

Witnesses
Frank A. Fahle
Thomas W. McMeans

Inventor
Frank H. Jones,
By Bradford & Hood.
Attorneys

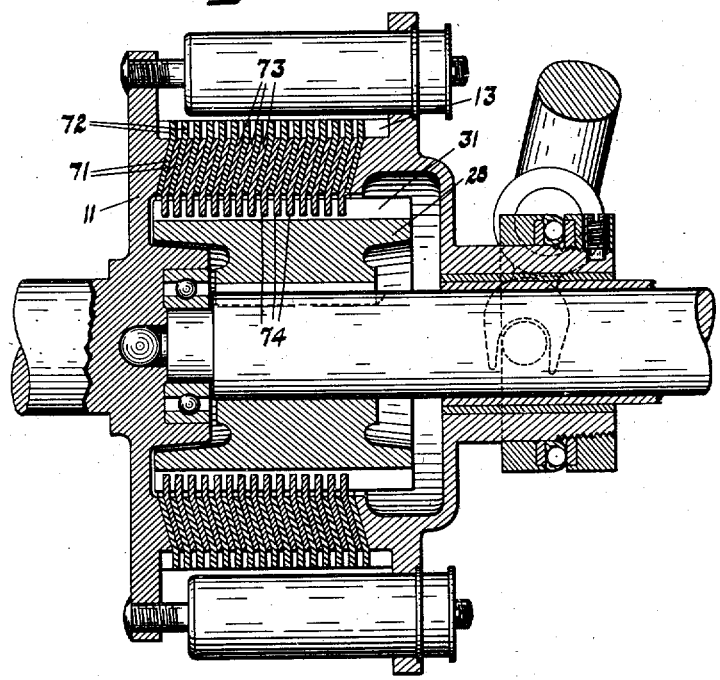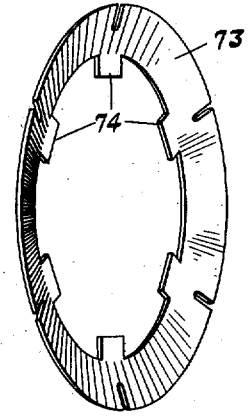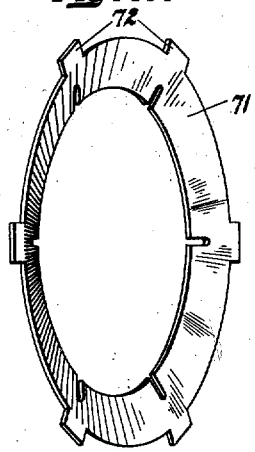

UNITED STATES PATENT OFFICE.

FRANK H. JONES, OF MUNCIE, INDIANA, ASSIGNOR TO WARNER GEAR COMPANY, OF MUNCIE, INDIANA, A CORPORATION OF INDIANA.

CLUTCH.

1,017,762.  Specification of Letters Patent.  Patented Feb. 20, 1912.

Application filed February 10, 1910. Serial No. 543,150.

*To all whom it may concern:*

Be it known that I, FRANK H. JONES, a citizen of the United States, residing at Muncie, in the county of Delaware and State of Indiana, have invented a new and useful Clutch, of which the following is a specification.

The object of my invention is to provide an improved multiple disk friction clutch.

The accompanying drawings illustrate my invention.

Figure 1:
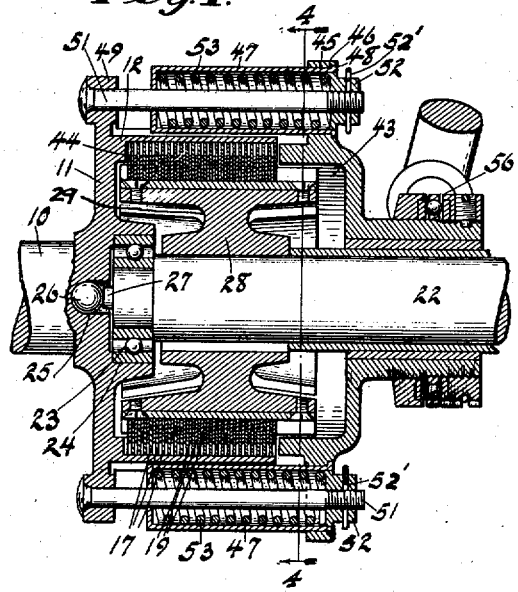
Figure 2:
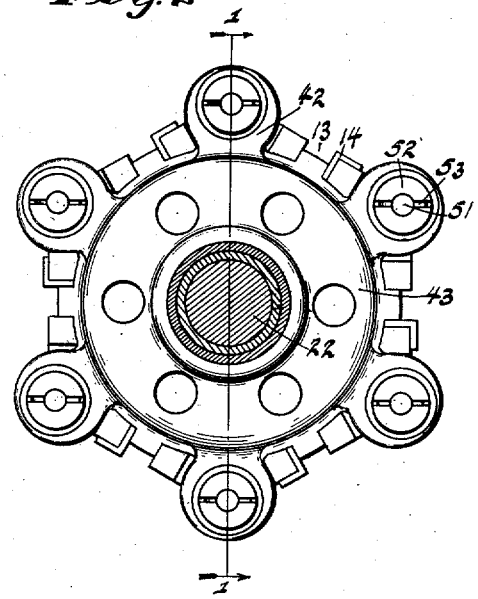
Figure 3:
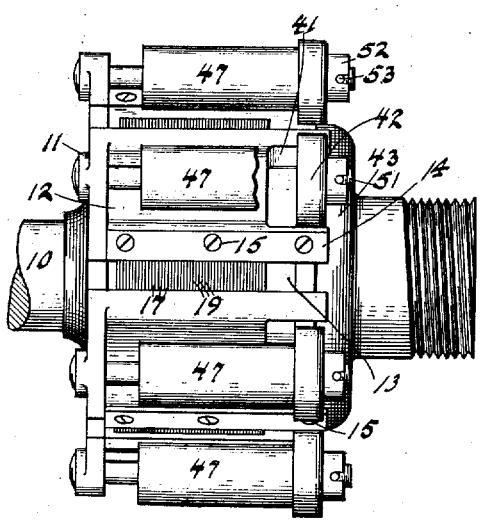
Figure 4:
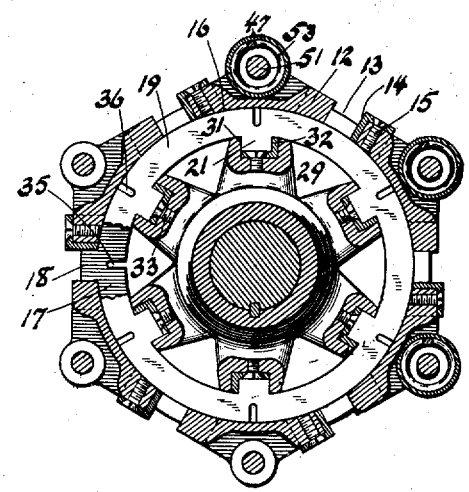
Figure 5:
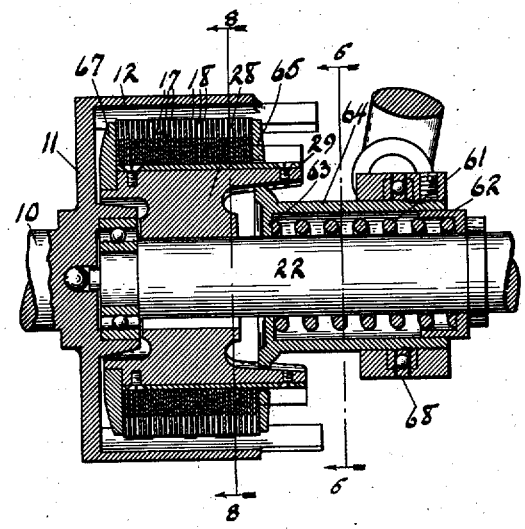
Figure 6:
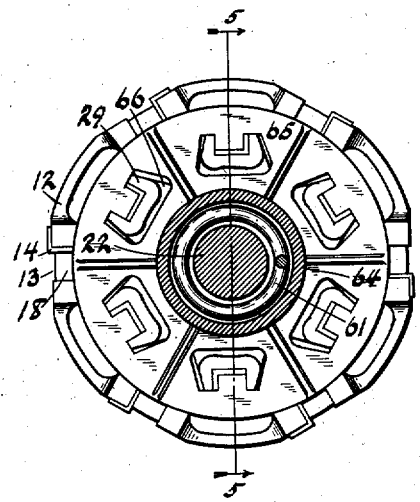
Figure 7:
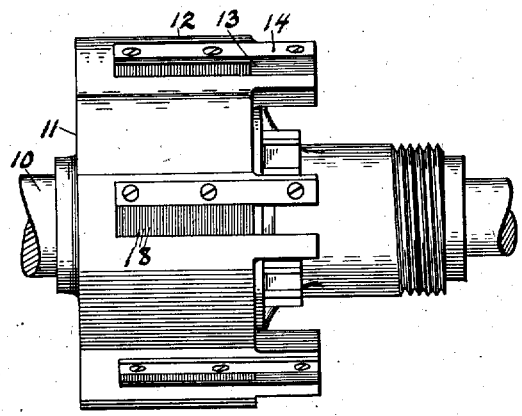
Figure 8:
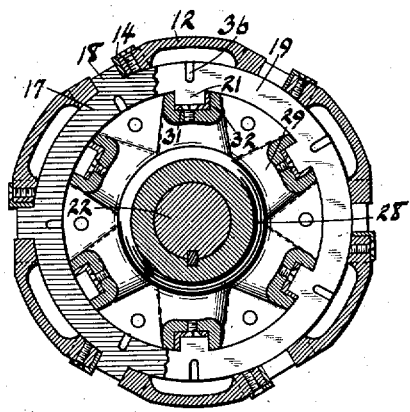

Figure 1 is an axial section of an embodiment of my invention; Fig. 2 an end elevation in partial section; Fig. 3 a side elevation; Fig. 4 a section on line 4—4 of Fig. 1; Fig. 5 an axial section of another embodiment of my invention; Fig. 6 a section on line 6—6 of Fig. 5; Fig. 7 a side elevation of the structure shown in Fig. 5; Fig. 8 a section on line 8—8 of Fig. 5; Fig. 9 an axial section of a clutch with modified friction elements, and Figs. 10 and 11 perspective views of modified friction elements.

In the drawings, 10 indicates a short shaft section adapted to be connected to a driving or driven member, as for instance the main shaft of an automobile engine. Formed integrally with shaft 10 is a circular head or plate 11 provided with a plurality of circumferentially arranged, axially parallel arms 12. These arms 12 are circumferentially separated so as to form passages 13 between them and secured to one edge of each arm is a wearing plate 14 which is preferably in the form of a steel angle, as shown, removably secured to the arm 12 by means of screws 15. The inner faces 16 of arms 12 are bored so as to together form a cylindrical pocket in which are nested several friction rings 17, conveniently formed of sheet metal and each provided with a plurality of outwardly extending fingers 18 adapted to fit in the ways 13 and lie against the adjacent wearing plate 14. Interdigitated with the friction rings 17 are friction rings 19, said rings being also nested within the surfaces 16. Each ring 19 is provided with a plurality of inwardly extending fingers 21.

Alining with shaft 10, and having its inner end projected into the pocket formed by surfaces 16, is a shaft 22 carrying one race of a ball bearing 23, the other race of which is seated in a pocket 24 formed in head 11. In order to take the thrusts of the parts I also form, at the axis of head 11, a pocket 25 in which is mounted a ball 26 against which bears a small stud 27 carried at the inner end of shaft 22. Keyed to shaft 22 and lying within the pocket formed by surfaces 16, is a head 28 having a plurality of radial arms 29 in the circumferential surface of each of which is formed a longitudinal extending groove 31. One side of groove 31 is formed by an L-shaped wearing plate 32 seated in the bottom of the groove and detachably held in position by one or more screws 33, the construction being such that the groove 31 thus formed is adapted to receive the fingers 21 of the friction rings 19. By this arrangement the friction rings 19, while free to move axially, are compelled to rotate with head 28 and the friction rings 17 are compelled to rotate with head 11.

In order to insure a proper oiling of the friction surfaces of the two sets of rings 17 and 19 I form in the inner edge of each ring 17 a plurality of outwardly extending notches 35 which, in order that the rings 17 may not be materially weakened, are preferably formed opposite each finger 18, and each of these notches is preferably extended to or slightly beyond the medial line of the ring. Similarly I form in the outer edge of each ring 19 a plurality of inwardly extending notches 36, which are preferably located opposite the fingers 21 and which preferably extend to or slightly beyond the medial line of the ring so that, as one set of rings rotates relative to the other, one set of notches will be brought into overlapping register with the other set of notches and thus insure a perfect delivery of lubricating oil throughout the interengaging frictional surfaces of the two sets of rings.

Thus far the structures shown in Figs. 1 to 4 inclusive and that shown in Figs. 5 to 8 inclusive are substantially identical. In the construction shown in Figs. 1 to 4 inclusive each of the fingers 12 is notched at 41, at its outer end, and projected into each of these notches is a radially extending finger 42 which is integral with a clamping cup 43 journaled upon shaft 22. The projection of the fingers 42 into notches 41 compels a rotation of cup 43 with head 11 and the inner edge of the cup is adapted to engage the outermost ring 19, while the innermost ring 18 abuts against a shoulder 44 formed in head 11. The cup 43 may be forced into engagement with the friction rings by any suitable means but I prefer to provide springs by means of which the cup 43 will be normally held in engagement with the adjacent ring 19 by a full clamping pressure so that the friction rings will be normally pressed together with their full operative force. For this purpose I form in each finger 42 a circular opening 45 having a shoulder 46. Slipped through each opening 45 is a spring casing 47 having a flange 48 at its open end to engage shoulder 46. Head 11 is provided with a plurality of radially extending ears 49 each of which is perforated to permit the passage of a bolt 51 which is projected entirely through a spring casing 47 and provided with a nut 62 which slidingly fits within the open end of spring casing 47 and is formed to receive one end of a compression spring 53 which lies within the casing 47. Enough of the spring structures above described are distributed around the clutch structure to insure a uniformity of axial movement of the cup 43 and, in order that the pressures exerted by the several springs may be uniform so as to prevent any tendency to a tilting of the friction rings relative to each other, each of the nuts 52' is threaded upon its bolt so that the tension of the several springs 53 may be readily independently adjusted, each nut being held in position by a readily removable cotter-pin 52' passed through the bolt and lying within a radial slot or opening 54 formed in the head. In order to shift the cup 43 away from the friction rings any suitable means may be provided, as, for instance, a shifting collar 56 engaging suitable shoulders or collars carried by the cup 43.

In the form shown in Figs. 5 to 8 inclusive, head 11' provided with arms 12' is very similar to the head 11, but, instead of the plurality of springs 53, I provide a single heavier spring 61 which encircles shaft 22. This spring at one end lies within a cup 62 which is mounted upon shaft 22 and held against outward axial displacement and the other end of said spring engages a wall 63 at the inner end of a tubular clamp 64 which is slidingly mounted upon shaft 22, the outer open end of the tube receiving cup 62. At its inner end, the tubular clamp 64 is provided with a circular plate 65 which is adapted to engage the outermost friction ring 19, as clearly shown in Fig. 5, and this plate is provided with a plurality of perforations 66 through each of which is freely projected one of the arms 29 of head 28. In this form the head 28 differs slightly, at one end, from the head 28 shown in Fig. 1 because at the inner end I provide an abutment ring 67 against which the innermost friction ring 19 may abut. The shifting collar 64 may be moved against the action of spring 61 by a suitable shifting collar 68.

In the construction shown in Figs. 9, 10, and 11, I have shown a modified form of friction elements which I find in practice to release more promptly than the construction shown in the other figures. In this construction each friction element 71 is conified into the frustum of a cone and at its outer edge provided with fingers 72 adapted to lie in the slots 13 of head 11''. Similarly the friction elements 73 are formed into the frustum of a cone and provided at their inner edges with inwardly projecting fingers 74 adapted to lie in the grooves 31 of head 28. In practice I find that friction elements of this form let go much more promptly than elements of the form shown in the other figures of the drawings.

I claim as my invention:

1. A multiple disk clutch comprising a rotary head formed integral with the supporting shaft and having a plurality of circumferentially arranged axially parallel arms, a wearing plate secured in position along one edge of each of said arms, a plurality of friction rings nested within said arms and having outwardly extending fingers projecting between said arms and engaging a wearing plate, a shaft arranged axially relative to the rotary head and projected into the space between its arms, a head secured to the inner end of said shaft and lying within the space between said arms, said head having a plurality of axially extending grooves in its circumference, a wearing plate detachably mounted in one side of each of said grooves, a plurality of friction rings interdigitated with the first mentioned friction rings and having inwardly projecting fingers lying within the grooves of the last-mentioned head and engaging said last-mentioned wearing plates, and a clamping member rotatively connected to the first mentioned head and arranged to force the interdigitated friction rings into engagement with each other.

2. A multiple disk clutch comprising a rotary head formed integral with the supporting shaft and having a plurality of circumferentially arranged axially parallel arms, a plurality of friction rings nested within said arms and having outwardly extending fingers projecting between said arms and engaging a wearing plate, a shaft arranged axially relative to the rotary head and projected into the space between its arms, a head secured to the inner end of said shaft and lying within the space between said arms, said head having a plurality of axially extending grooves in its circumference, a plurality of friction rings interdigitated with the first mentioned friction rings and having inwardly projecting fingers lying within the grooves of the last-mentioned head and engaging said last-mentioned wearing plates, an axially movable clamping member rotatively connected to the first mentioned head and arranged to force the interdigitated friction rings into engagement with each other, and yielding means for yieldingly urging said clamping member into clamping position.

3. A multiple disk clutch comprising a rotary head formed integral with the supporting shaft and having a plurality of circumferentially arranged axially parallel arms, a wearing plate secured in position along one edge of each of said arms, a plurality of friction rings nested within said arms and having outwardly extending fingers projecting between said arms and engaging a wearing plate, a shaft arranged axially relative to the rotary head and projected into the space between its arms, a head secured to the inner end of said shaft and lying within the space between said arms, said head having a plurality of axially extending grooves in its circumference, a wearing plate detachably mounted in one side of each of said grooves, a plurality of friction rings interdigitated with the first mentioned friction rings and having inwardly projecting fingers lying within the grooves of the last-mentioned head and engaging said last-mentioned wearing plates, a clamping member rotatively connected to the first mentioned head and arranged to force the interdigitated friction rings into engagement with each other, and yielding means for yieldingly urging said clamping member into clamping position.

4. A multiple disk clutch comprising a rotary head having a plurality of circumferentially arranged axially parallel arms, a plurality of friction rings nested within said arms and having outwardly extending fingers projecting between said arms, a shaft arranged axially relative to the rotary head and projected into the space between its arms, a head secured to the inner end of said shaft and lying within the space between said arms, said head having a plurality of axially extending grooves in its circumference, a plurality of friction rings interdigitated with the first mentioned rings and having inwardly projecting fingers lying within the grooves of the last-mentioned head, a clamping cup having an interlocking axially-movable connection with the arms of the first-mentioned head, a plurality of spring containers seated in said clamping cup, a plurality of bolts carried by said first-mentioned head and extended through said spring containers, a spring mounted in each of said containers, and a nut carried by each bolt and engaging a spring.

5. A multiple disk clutch comprising a rotary head formed integral with the supporting shaft and having a plurality of circumferentially arranged axially parallel arms, a plurality of friction rings nested within said arms and having outwardly extending fingers projecting between said arms and engaging a wearing plate, a shaft arranged axially relative to the rotary head and projected into the space between its arms, a head secured to the inner end of said shaft and lying within the space between said arms, said head having a plurality of axially extending grooves in its circumference, a plurality of friction rings interdigitated with the first-mentioned friction rings and having inwardly projecting fingers lying within the grooves of the last-mentioned head and engaging said last-mentioned wearing plates, a clamping cup having an interlocking axially-movable connection with the arms of the first-mentioned head, a plurality of spring containers seated in said clamping cup, a plurality of bolts carried by said first-mentioned head and extended through said spring containers, a spring mounted in each of said containers, and a nut carried by each bolt and engaging a spring.

6. A multiple disk clutch comprising a rotary head having a plurality of circumferentially arranged axially parallel arms, a wearing plate secured in position along one edge of each of said arms, a plurality of friction rings nested within said arms and having outwardly extending fingers projecting between said arms, a shaft arranged axially relative to the rotary head and projected into the space between its arms, a head secured to the inner end of said shaft and lying within the space between said arms, said head having a plurality of axially extending grooves in its circumference, a wearing plate detachably mounted in one side of each of said grooves, a plurality of friction rings interdigitated with the first-mentioned friction rings and having inwardly projecting fingers lying within the grooves of the last-mentioned head, a clamping cup having an interlocking axially-movable connection with the arms of the first-mentioned head, a plurality of spring containers seated in said clamping cup, a plurality of bolts carried by said first-mentioned head and extended through said spring containers, a spring mounted in each of said containers, and a nut carried by each bolt and engaging a spring.

7. A multiple disk clutch comprising a rotary head formed integral with the supporting shaft and having a plurality of circumferentially arranged axially parallel arms, a wearing plate secured in position along one edge of each of said arms, a plurality of friction rings nested within said arms and having outwardly extending fingers projecting between said arms and engaging a wearing plate, a shaft arranged axially relative to the rotary head and projected into the space between its arms, a head secured to the inner end of said shaft and lying within the space between said arms, said head having a plurality of axially extending grooves in its circumference, a wearing plate detachably mounted in one side of each of said grooves, a plurality of friction rings interdigitated with the first-mentioned friction rings and having inwardly projecting fingers lying within the grooves of the last-mentioned head and engaging said last-mentioned wearing plates, a clamping cup having an interlocking axially-movable connection with the arms of the first-mentioned head, a plurality of spring containers seated in said clamping cup, a plurality of bolts carried by said first-mentioned head and extended through said spring containers, a spring mounted in each of said containers, and a nut carried by each bolt and engaging a spring.

8. In a clutch, the combination of two rotary heads and two sets of interdigitated friction rings arranged between said heads, adjacent rings having oppositely extending over-lapping oil distributing notches formed in the edges thereof.

9. In a clutch, the combination of two rotary heads and two sets of interdigitated friction rings arranged between said heads, adjacent rings having oppositely extending oil distributing notches formed in the edges thereof.

In witness whereof, I, FRANK H. JONES have hereunto set my hand and seal at Muncie, Indiana, this 5th day of February, A. D. one thousand nine hundred and ten.

FRANK H. JONES. [L. S.]

Witnesses:
 C. E. DAVIS,
 W. H. CHURCH.